(12) United States Patent
Sun

(10) Patent No.: US 6,168,666 B1
(45) Date of Patent: Jan. 2, 2001

(54) FOCUSED ACOUSTIC BEAD CHARGER/DISPENSER FOR BEAD MANIPULATING CHUCKS

(75) Inventor: Hoi Cheong Sun, Monmouth Junction, NJ (US)

(73) Assignee: Sarnoff Corporation, Princeton, NJ (US)

( * ) Notice: Under 35 U.S.C. 154(b), the term of this patent shall be extended for 0 days.

(21) Appl. No.: 09/083,487

(22) Filed: May 22, 1998

(51) Int. Cl.$^7$ .................................................. B05B 5/025
(52) U.S. Cl. .......................... 118/627; 118/621; 118/308
(58) Field of Search ................................... 118/620, 621, 118/627, 300, 308

(56) References Cited

U.S. PATENT DOCUMENTS

| | | | |
|---|---|---|---|
| 4,780,331 | 10/1988 | Cobbs, Jr. et al. | 427/25 |
| 5,205,896 | 4/1993 | Brown et al. | 156/297 |
| 5,753,302 | * 5/1998 | Sun et al. | 427/180 |
| 5,788,814 | * 8/1998 | Sun et al. | 204/297 R |
| 5,846,595 | * 12/1998 | Sun et al. | 427/2.14 |
| 5,858,099 | * 1/1999 | Sun et al. | 118/621 |

OTHER PUBLICATIONS

European Patent Office, International Search Report for PCT/US 99/11318, Sep. 28, 1999, all 5 pages pertinent.

\* cited by examiner

*Primary Examiner*—James Sells
(74) *Attorney, Agent, or Firm*—William J. Burke (57) ABSTRACT

Acoustic bead charger/dispenser employs a bead dispersion plate (BDP) to align beads with, for example, bead collection zones of a bead transporter chuck, then propel or launch them toward the bead collection zones, using acoustic energy provided by a speaker. The bead dispersion plate can be configured so that the acoustic energy from the speaker may be directed so as to impart to the bead translational kinetic energy primarily in a direction toward the bead collection zone of the bead transporter chuck. The bead dispersion plate can comprise a conductive surface that can be used to accelerate the beads toward the bead transporter chuck. Using sufficient acoustic energy applied by the speaker, sufficient translational kinetic energy can be imparted to beads to remove them from the conductive surface when they are under the influence of an electrostatic image force. The bead dispersion plate can optionally comprise a tribo-charging mesh (MESH) for inductive charge transfer tribo-charging during application of acoustic energy. The bead dispersion plate can comprise a distribution system, including a bead reservoir and metering pump to controllably feed and retrieve the beads from the bead dispersion zones of the bead dispersion plate. Methods are given for using the acoustic bead charger/dispenser to align beads with a bead collection zone of a bead transporter chuck, and to propel the beads toward the bead collection zone.

12 Claims, 1 Drawing Sheet

FOCUSED ACOUSTIC BEAD CHARGER/DISPENSER FOR BEAD MANIPULATING CHUCKS

The present invention is directed to devices for electrostatically picking up and dispensing beads in a spatially resolved manner. Specifically, this disclosure describes a focused acoustic charger/dispenser for electrostatic bead transporter chucks, allowing focused and controlled distribution of beads for directed delivery aligned with bead collection zones. Electrostatic bead transporter chucks may be used to pick up, manipulate, transport, and then discharge or place beads or objects for use in creating pharmaceutical or chemical compositions, or in performing assays or chemical analysis.

Bead transporter chucks act as clamps to hold or retain an object or objects. Bead transporter chucks can provide superior performance for manipulating synthetic beads having typical diameters of 0.1–1 millimeters to in chemical synthesis, such as combinatorial chemistry for solid phase synthesis, or in an assay using nucleic acid amplification such as PCR (polymerase chain reaction) or other processes. In combinatorial chemistry, a multi-well array such as a microtiter plate allows screening or synthesis of many compounds simultaneously.

For example, bead transporter chucks allow deposition of beads on an array in a manner that is faster and more reliable than by the use of micropipettes, which can be inefficient, tedious, and time consuming. Another application for bead transporter chucks is synthesis of pharmaceutical compositions, especially when used to combine compounds to form compositions to be packaged into administration foims for humans or animals.

Beads containing one or more active ingredients may be deposited onto well known carriers or substrates to make pharmaceutical dosage forms. Such beads may take the form, for example, of [1] a powder, such as dry micronized forms made by air jet milling processes, where overall particle dimensions can be, for example, in the 1 to 10 micron range useful for dry powder respiratory administration of medicaments, with 4–8 microns preferred; [2] microspheres; [3] extremely small structures, including fullerenes, chelates, or nanotubes; or [4] liposomes and fatty droplets formed from lipids or cell membranes.

The use of bead transporter chucks provides a customized and precise method for formulating drug compositions. The transporter can be used when merging adjacent substrates carrying active ingredient to form multidosage packs, in which dosage may decrease or increase fiom one individual unit to the next, as in hormone-based (e.g., birth control) drugs or antibiotic remedies. Using an electrostatic bead transporter chuck, dosages may be easily established or determined by the number and/or type of beads dispensed onto each pharmaceutical carrier. Using bead transporter chucks to place active ingredients into pharmaceutical compositions can give high repeatability and is also advantageous when the active ingredients are not compatible, such as when the active ingredient is poorly soluble with the carrier, or where a formulation or carrier negatively affects the bioavailability of the active ingredient.

Although emphasis is placed in this disclosure on use of electrostatic bead transporter chucks that apply electric fields for bead retention and/or release, the teachings given here may be applied to chucks using other phenomena, such as the use of compressed gas or vacuum, or electrically/chemically switchable adhesives, in controlling beads. Electrostatic holding mechanisms, however, are benign to delicate bead structures, particularly when manipulating biologically active compounds where crushing, contamination, or oxidative damage must be minimized or eliminated.

The present invention can involve use of acoustic stimulation or acoustic dispensers, where acoustic energy, provided by a speaker or piezoelectric device, is used to great advantage in bead control, that is, propelling and/or tribocharging beads prior to, and especially during, electrostatic manipulation. Tribocharging beads, as known in the art, and described below, is more efficient and less damaging to the beads than corona or plasma charging, which typically requires high applied voltages of around 5 kV. Often, the sonically vibrating membrane or mesh used in such an acoustic bead dispenser can itself be used to tribocharge particles, eliminating the need to charge the beads prior to their entry into an acoustic dispenser. The use of acoustic dispensers allows polarity discrimination of beads, where wrongly charged beads are discouraged from being retained by the bead transporter chuck.

Bead transporter chucks offer precision in being able to have one, and only one bead attracted, transported, and discharged for each bead transporter chuck, or for each well, pixel, or individual spatial element of the bead transporter chuck. In many cases, each pixel can be considered a tiny bead transporter chuck that is selectively and independently controlled, such as planar chucks having individually addressable x and y coordinates. This includes individually addressable pixels for different (multiple) bead types.

Beads manipulated by these bead transporter chucks (or bead manipulating chucks) are easily and controllably releasable, with wrongly charged beads (objects or beads having a charge of the opposite polarity desired) not occupying bead retaining or collection zones on the bead transporter chuck. They function well for a wide range of bead diameters, including beads with general dimensions of 100 microns and up, and also including porous or hollow beads that have high charge/mass ratios. They also offer durability and re-usability, and good ease-of-use, including having selectively or wholly transparent elements for easy movement and alignment of the chuck with intended targets or carriers.

Bead transporter chuck designs that use simple attraction electrodes to pick up and discharge beads can, under certain conditions, encounter serious problems with bead density and control. One problem encountered is that many more beads than desired can be attracted to intended bead collection zones. During synthesis or analysis, instead of retaining one and only one bead per bead collection zone, multiple beads or even whole clumps of beads can be attracted to bead collection zones when using typical or desired attracting voltages needed for efficient manipulation of the beads. Alternatively, in seeking to avoid this bead clumping by reducing the applied (attraction) voltage, the attraction field can then be insufficient to cause beads to deposit in the required manner, i.e., one bead per hole, without either having beads attracted to unintended or wrong locations on the bead transporter chuck, or having wrongly charged beads attracted to the bead transporter chuck.

In the course of using bead transporter chucks for creating pharmaceutical or chemical compositions, or in performing assays or chemical analysis, certain problems arise and certain requirements have been identified.

First, charged beads must be freed from electrostatic image forces in order to leave any conductor to be picked up by the bead transporter chuck. As a charged bead approaches any metal or other conductive material, such as a conductive material inside the bead dispenser or container, an image charge of opposite polarity will accumulate on that conductive material. This happens when mobile charge carriers in the conductive surface are attracted by, or repelled by, the bead charge. This movement of charge in the conductive surface in response to a charged bead in the vicinity creates a potent image charge-induced holding force, or electrostatic image force. This electrostatic image force tends to keep the bead in tight contact with, or highly attracted to, the conductive material. It should be noted that dielectric beads in stationary tight contact with a conductive surface have a tendency to keep their charge for a period of days. With a bead close to any conductor, the electrostatic image force generated tends to be greater than that due to any applied field used to accelerate the beads toward the bead transporter chuck, and can be on the order of hundreds of times the force due to gravity. This leaves the beads "glued" to the conductor or conductive surface, unable to move toward bead collection zones in the bead transporter chuck.

Typically beads to be transported or manipulated are tribo-charged through frictional encounters and collisions, such as rubbing or bumping into metal surfaces, where charging can occur by charge induction or charge transfer. The particular charge transfer mechanisms used in a tribo-charging process will determine the applied voltages that should be used on a charging mesh. Beads thus tribo-charged tend to carry low charge/mass ratios (q/m). However, in practice, attraction voltages applied in using a bead transporter chuck give high resultant electric fields (e.g., V/D=3000 V /0.005 m) that are more than high enough to lift and guide beads against gravity toward bead collection zones on the chuck. However, with electrostatic image forces holding charged beads down to any available conductor inside the bead transporter chuck, an aid is needed to provide bead liftoff from the conductor so that applied or attraction voltages can be useful in bead manipulation.

Second, bead motions and interactions, or collisions with obstacles—and each other—inside a dispenser or container tend to randomize their motion, making it more likely to have the beads attaching themselves to the wrong places or not being captured as readily in intended bead collection zones as desired. Even though beads tend to be accelerated toward the bead collection zones on the bead transporter chuck by one or more attraction fields, it is believed that these motions, interactions and collisions and bombardments tend to dissipate the directionality of their velocity—in short, beads are diverted from their intended direction of movement.

Like molecules in a slow-moving ideal gas, each bead that is on its way toward one or more bead collection zones can be described as having its own kinetic energy of translation (that is, movement through space, as opposed to bead rotation or vibration), with beads in prior bead dispenser designs having a more even distribution of kinetic energy associated with each 3 dimensional coordinate, e.g., x, y, and z. The beads' direction of motion becomes, through collisions and interactions, dispersed, tending to become distributed more or less randomly, with a resulting equipartition of their kinetic energies into each direction or translational degree of freedom. This randomization of motion makes attracting beads to bead collection zones singly and accurately more difficult.

Third, the method used for introducing beads to the bead dispenser for pickup by one or more bead transporter chucks should give reliable performance in attracting beads singly to each bead collection zone. A provision for even and controlled distribution of beads to a bead dispenser or other theatre for use by a bead transporter chuck is needed to assure easy feeding of beads with little or no significant mechanical or personal intervention. Even and controlled distribution of beads that are made available for attraction by bead transporter chucks is needed for ease of operation during chemical synthesis or analysis. Preferably, such controlled distribution should be aligned spatially with intended bead collection zones to facilitate speed and accuracy.

Methods for use of bead transporter chucks and acoustic bead dispensers are set forth in Sun, "Chucks and Methods for Positioning Multiple Objects on a Substrate," U.S. Pat. No. 5,788,814, issued Aug. 4, 1998; Sun et al., "Electrostatic Chucks," U.S. Pat. No. 5,858,099, issued Jan. 12, 1999; Pletcher et al., "Methods and Apparatus for Electrostatically Depositing a Medicament Powder Upon Predefined Regions of a Substrate," U.S. Pat. No, 6,007,630 issued Dec. 28, 1999; Pletcher et al., "Method and Apparatus for Electrostatically Depositing a Medicament Powder Upon Predefined Regions of a Substrate," U.S. application Ser. No. 08/733,525, filed Oct. 18, 1996; Sun et al., "Acoustic Dispenser," U.S. Pat. No. 5,753,302, issued May 19, 1998; Sun, "Bead Manipulating Chucks with Bead Size Selector," U.S. Pat. No. 5,988,432, issued Nov. 23, 1999; Sun, "Bead Transporter Chucks Using Repulsive Field Guidance," U.S. application Ser. No. 09/026,303, filed Feb. 19, 1998. These applications or patents are hereby incorporated by reference in their entireties.

It is therefore desirable to provide bead liftoff in a preferred direction to escape electrostatic image forces, without damage to the beads. This launch assistance should directionally propel beads toward intended bead collection zones of the bead transporter chuck, overcoming electrostatic image forces, and should preferably impart translational kinetic energy to the bead in a preferred direction, to reduce bead scatter and enhance accurate bead capture only in bead collection zones. Further, this launch assistance with an emphasis on one translational degree of freedom (one direction) should be spatially focused or aligned with the intended bead collection zones as well.

It is also preferable to have a means for even bead distribution and control, with a minimum of mechanical intervention needed, for supplying beads to be singly captured at intended bead collection zones. This bead distribution and control should also provide for spatial alignment with intended bead collection zones. In attracting and manipulating beads, image charges, electric polarization, bead initial velocity, bead supply or transport and bead distribution play a role.

SUMMARY OF THE INVENTION

These problems are addressed by this invention by introducing an acoustic bead charger/dispenser that provides for [1] alignment of beads with targets, such as the bead collection zones of a bead transporter chuck, using a bead dispersion plate; [2] propulsion, launching or liftoff of the beads toward the bead collection zones, using acoustic energy provided by a speaker; and [3], optionally, acoustically aided charging of beads with a charging mesh while the beads are available for contact with the acoustic bead charger/dispenser.

In one embodiment, a bead dispersion plate is provided, shaped and configured collect at least one of the beads at a bead dispersion zone on the bead dispersion plate. The bead dispersion zone is spatially aligned with the bead collection zone of the bead transporter chuck. A speaker in fluid communication with the bead dispersion plate is used to provide acoustic energy to propel the bead toward the target.

The bead dispersion plate can be shaped and configured so that the acoustic energy from the speaker may be directed to impart to the bead translational kinetic energy primarily in a direction toward the target.

The bead dispersion plate can optionally comprise a conductive surface that can be used to accelerate the beads toward the target. Using sufficient acoustic energy applied by the speaker, sufficient translational kinetic energy can be imparted to beads so as to remove them from the conductive material when they are under the influence of an electrostatic image force.

The bead dispersion plate can optionally comprise a charging mesh (MESH) situated to allow contact of the charging mesh with the bead at the bead collection zone, and to allow charge transfer from the bead.

The bead dispersion plate can also optionally comprise bead channeling (BC) allowing fluid-like communication to bead dispersion zones, with the bead channeling sized and configured to allow passage of beads to and from the bead dispersion zones. A bead reservoir and metering pump may be used to controllably feed and retrieve the beads from the bead dispersion zones of the bead dispersion plate.

The acoustic bead charger/dispenser can additionally comprise an air focus plate, formed and configured to direct and focus the acoustic energy to the bead dispersion zone of the bead dispersion plate.

Also disclosed are methods for using the acoustic bead charger/dispenser to align beads with a bead collection zone of a bead transporter chuck, and to propel the beads toward the bead collection zone. Steps given can include

[a] collecting at least one the bead at the bead dispersion zone of the acoustic bead charger/dispenser;

[b] applying a first potential to a bead electrode of the bead transporter chuck to create a bead attracting field;

[c] applying acoustic energy to the bead dispersion plate to propel the bead toward the bead collection zone; and

[d] attracting and retaining the bead to the target.

If the bead dispersion plate comprises a conductive surface, additional steps given include applying a second potential to the conductive surface of the bead dispersion plate to create a repulsive field to assist in accelerating beads to the bead collection zones on the bead transporter chuck. If the bead dispersion plate additionally comprises a charging mesh, charge transfer from the bead(s) can occur during application of acoustic energy by the speaker. A potential can be applied to the charging mesh to aid charge transfer by charge transfer induction.

DEFINITIONS

The following definitions shall be employed throughout:

"Acoustic" can refer to sound waves in air, but more generally may include any alteration of properties of whatever elastic medium is used inside the bead dispenser or bead manipulation theatre. Possible elastic media include dry nitrogen or other gases; water; oil; propylene glycol; refrigerants, such any of the compounds bearing the trademark, FreonS (aliphatic organic compounds, often C1 or C2 compounds, containing the elements carbon and fluorene, and others halogens such as chlorine and hydrogen such as $CCl_3F$, $CCl_2F_2$, $CF_4$, $C_2Cl_2F_4$ or octafluorocyclobutane); sand; etc. Properties that may be altered include, for example, pressure, particle or molecule displacement, or density. Most commonly, this is achieved using longitudinal compressive waves in the elastic medium, for instance provided by a speaker (see definition below), but it can also occur by using jets or flow of the elastic medium.

"Bead" or "beads" shall refer to any material thing such as a particle, object, tablet or receptacle, capable of being manipulated. This shall include spheres or globules made from polymer and reactive polymer masses, such as styrene-based polymers used in the Merrifield type of solid-phase synthesis.

"Conductor" and "electrode" shall include surfaces or sets of surfaces, continuous or non-continuous, that are capable of carrying electric current.

"Bead electrode" shall connote any electrode meant to attract and retain materials things such as beads, objects, or particles. It can optionally comprise at least one hole or aperture through which a bead or object can be viewed. Upon reducing of the electrical potential applied to it, a bead electrode can allow discharge or release of any bead or beads retained.

"Bead contact surface" shall include all surfaces of the bead manipulating chuck that are accessible to bombardment, contact or exposure to beads, regardless of whether such access is physically encouraged or discouraged. However, when discussing specifically the bead collection zone (see definition below), the bead collection zone can then be considered separately from the remainder of the bead contact surface, to facilitate description of its placement in the bead manipulating chuck.

"Bead collection zones" shall include surfaces of the bead contact surface at which bead attracting fields generated by bead electrodes attract and favor retention of a bead. The bead collection zones can be found at holes, apertures, or recessed areas of the bead contact surface, or elsewhere.

"Bead dispersion zones" shall include surfaces of the bead dispersion plate at which beads accumulate and/or are retained momentarily, from which they are propelled or driven to corresponding bead collection zones on a bead transporter chuck.

"Dielectric" shall refer to any dielectric material, such as electric insulators in which an electric field can be sustained with a minimum power input; the term is applied generally such that solid metals, if manipulated to meet this definition, for example with a radio frequency applied voltage, can be considered dielectrics. This dielectric material need not be solid (e.g., it can be hollow) and it can be made up of substructures or different constituent dielectric subparts or material types.

"Reducing," such as in the context of reducing applied potentials to bead electrodes to allow bead discharge, shall include reduction and reversal of polarity of the applied potential, such as going from +500 V to −500 V or vice versa.

"Shield electrode" refers to electrodes that are used at the bead contact surface to shield (at least partially) a charged bead from being influenced by attraction fields emanating from a bead collection zone, and/or to define and shape (narrow) the local electric attraction field to encourage bead retention only in intended bead collection zones.

"Speaker" can refer to any loudspeaker, transducer, machine, or device, such as a piezoelectric device, that is capable of providing acoustic energy, such as through pressure modulation; often, it is any device capable of altering the properties of the elastic medium used inside the bead dispenser or bead manipulation theatre.

It is also important to note that although the term electrostatic is used throughout this disclosure, no limitation is meant or intended in terms of time variations of charge on electrodes and conductors used in the present invention. Electrical currents can and will flow in the course of using the bead manipulating chucks as described, in order to apply and remove electric charge as required. Potentials refer to electric potentials or applied voltages.

DETAILED DESCRIPTION OF THE INVENTION

Figure 1:
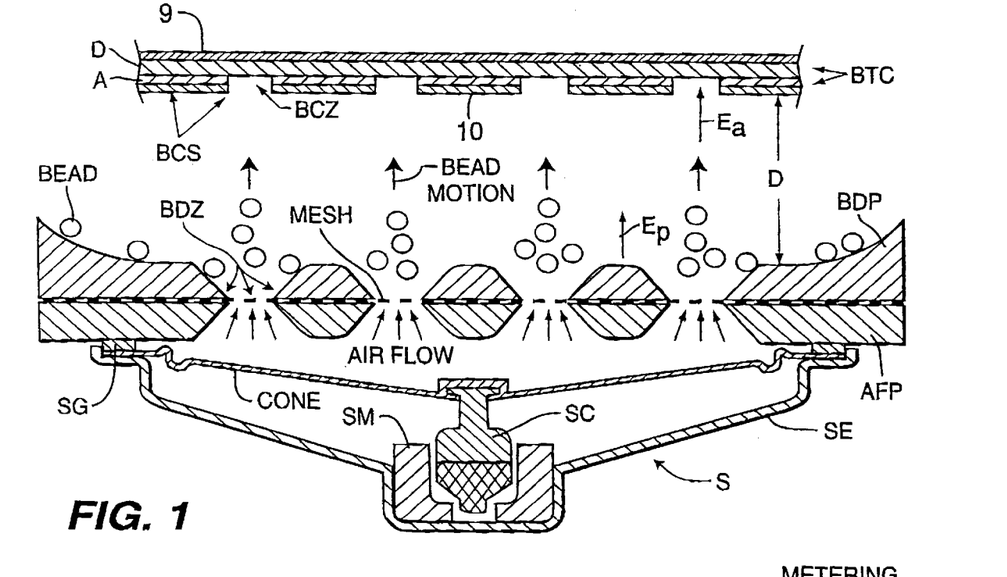
FIG. 1 shows a partial cross-sectional view of an acoustic bead charger/dispenser chuck according to the present invention, during acoustic stimulation, and shown in alignment with a bead transporter chuck having four pixels or bead collection zones.

Referring to FIG. 1, a partial cross-sectional view of an acoustic bead charger/dispenser according to the present invention is shown. At the top of this figure is shown a cross-sectional view of a bead transporter chuck BTC, given by way of example only, as there are many possible designs and configurations for chucks that may be used. To facilitate description, the sample bead transporter chuck BTC shown shall be described first.

Structures in the bead transporter chuck BTC allowing for four bead collection zones BCZ are given, by way of example. Bead transporter chuck BTC shown comprises shield electrode 10, which is applied to one face of dielectric layer D in a parallel plane using any number of techniques known in the art, such as laminating; powder deposition; or thin film deposition, such as magnetron sputtering or electron beam evaporation. As shown in the figure by way of example only, shield electrode 10 is affixed to dielectric layer D using an adhesive layer A, using any known adhesive capable of forming a mechanical bond. Dielectrics that can be used include commonly available materials such as Corning Pyrex 7740 glass (high melting point borosilicate glass, Corning Inc., Corning, N.Y.); a typical thickness is 10–50 microns. The shield electrode 10 is formed having apertures (as shown, by way of example). Each such aperture allows for establishing a bead collection zone BCZ, at the face of dielectric layer D. Generally shield electrode 10, and exposed portions of dielectric layer D form a bead contact surface BCS that is accessible to bombardment, contact or exposure to beads (Bead) inside a bead dispenser or container, not shown. The bead collection zone BCZ established is recessed from the remainder of bead contact surface BCS by way of example only, as there are other possible bead transporter chuck designs that do not use recessed bead collection zones.

In order to use applied voltages to establish an attraction field $E_a$, as shown pointing to the bead collection zone BCZ, bead electrode 9 is provided, at the other face of dielectric layer D.

Although the bead collection zone BCZ, formed on an exposed portion of dielectric layer D through an aperture in shield electrode 10, is shown as being flat, it can also be beveled, bowl-shaped, or have any other profile that can facilitate bead attraction, retention, and discharge.

Electric fields in this and later figures are shown using the standard convention, showing roughly the direction of the force on a positive test charge. However, for actual examples of applied voltages and bead manipulating chuck operation in this disclosure, a working convention is adopted that negatively charged beads are to be attracted and later discharged. When manipulating positively charged beads, one can simply reverse the applied voltages from those given in the discussion below.

As shown, bead electrode 9 is not exposed to the bead contact surface BCS or the bead collection zone BCZ. The electric field, however, generated by a potential applied to bead electrode 9 can emanate through dielectric layer D, with the net electric field generated diminished by electric polarization in dielectric layer D, depending on its dielectric constant, which can be anisotropic. See Classical Electrodynamics 2nd Ed., John David Jackson, ©1975, John Wiley & Sons, New York.

A voltage can be applied to bead electrode 9 relative to shield electrode 10 or relative to another surface in the bead dispenser or container to allow attraction of beads to the bead collection zone BCZ. Bead electrode 9 can serve to provide an attraction field for one, or for a plurality, of bead collection zones, as shown.

To aid in visual confirmation of bead capture at the bead collection zone BCZ, a hole (not shown) can be provided through bead electrode 9 and dielectric layer D. For a transparent or translucent dielectric layer D, such a hole provides a visual or optical monitor sight to verify if a bead is being retained. This allows for automated verification of bead occupancy in the bead collection zone, using known sensors to determine the hole opacity in terms of percent light transmission. For example, the light transmitted through such a hole can be optically mapped onto an array detector such as a charge-coupled device (CCD), an intensified CCD array, a focal plane array, or photodiode array. The array detector can be, for example, a CCD (such as that available from DALSA, Inc. (Easton Conn.), David Sarnoff Research Center (Princeton N.J.) or Princeton Instruments (Trenton N.J.); an intensified CCD array (such as that available from Princeton Instruments, Hamamatsu Corp. (Bridgewater, N.J.) or Photometrics Ltd. of Tucson, Ariz.); a focal plane array (such as that available from Scientific Imaging Technologies, Inc. (Beaverton, Oreg.), Eastman Kodak Co., Inc. (Rochester N.Y.) or David Sarnoff Research Center); a photodiode array (such as that available from Reticon Corp. (Sunnyvale Calif.), Sensors Unlimited, Inc. (Princeton N.J.) or Hamamatsu); or a photodetector array (such as that available from FLIR Systems Inc. (Portland Oreg.), Loral Corp. (New York N.Y.) or Hughes Electronic Corp. (Los Angeles Calif.)).

When grounded or biased to a polarity similar to the beads to be manipulated, shield electrode 10 can discourage beads from being attracted or retained at any locations on the bead contact surface BCS other than the intended bead collection zone BCZ. However, shield electrode 10 can comprise any nonconductive material such as an insulator or dielectric.

In lieu of dielectric layer D, air or the ambient gas or vacuum can be used as a dielectric or insulator. In this case, insulated mechanical standoffs or other fasteners can be used to hold bead electrode 9 in the same plane as, but offset from, shield electrode 10. This would expose one or both of bead electrode 9 and shield electrode 10 directly to the bead contact surface.

Although the bead transporter chuck shown in FIG. 1 is given by way of example only, it should be said that fabrication techniques for forming its conductive layers and electrodes can vary considerably, as any known technique satisfying modest electrical and mechanical requirements can be used. Nearly any metal can be used, for example, to form bead electrode 9 and shield electrode 10, which can comprise thermally or electromagnetically deposited metals such as indium tin oxide, brass, platinum, copper, or gold, of any useful thickness, but preferably about 1000 Angstroms to 10 microns (100,000 Angstroms). The same is true for dielectric layer D or laminates—the materials used can be of any type compatible with surrounding electrodes, and having sufficient dielectric strength to withstand anticipated voltages applied, including ceramic materials; silicon dioxide; alumina; polyimide resins and sheets or other suitable polymers; metallic oxides, such as aluminum oxide and titanium oxide; and titanates of calcium and magnesium. Dielectric layer D can range in thickness from ten Angstroms to 1000 microns. Many of these fabrication methods do not require use of adhesive layer A.

Now, referring to the remainder of FIG. 1, shown underneath the bead transporter chuck BTC is the partial cross sectional view of the acoustic bead charger/dispenser. The acoustic bead charger/dispenser is shown comprising bead dispersion plate BDP, whose bottom is affixed to or in contact with, one face of an optional planar charging mesh (MESH), which can optionally be a tribo-charging mesh. Formed on bead dispersion plate BDP are one or more apertures, with optional surrounding depressions, that form four bead dispersion zones BDZ. Four such zones BDZ appear in this cross section by way of example. These bead dispersion zones BDZ can be formed on bead dispersion plate BDP by design, by having such features established using casting, punching, forging or molding; or by removal processes such as drilling, countersinking, routing, or milling. The bead dispersion zones BDZ are normally aligned with corresponding bead collection zones BCZ on the bead transporter chuck. Bead dispersion plate BDP may fabricated from any material having requisite mechanical properties, but bead manipulation is facilitated when bead dispersion plate BDP includes a conductor or conductive coating, that can be used as an electrode to which a voltage may be applied, as discussed below. For example, the mesh (MESH) can provide the conductor. The mesh (MESH) has holes or perforations of a diameter less than that of the smallest beads to be manipulated. The charging mesh and the bead dispersion zone BDZ formed on the bead dispersion plate BDP thus define a cavity into which beads (Bead) may accumulate or rest, prior to launching toward the bead collection zones BCZ of the bead transporter chuck, as discussed below. As an added feature, outer edges of the bead dispersion plate BDP are tapered upward to encourage strays beads to move back under force of gravity into the bead dispersion zones BDZ. It should be noted that image forces have not been observed to interfere with bead movement along a conductive surface.

Affixed or in contact with the other face of mesh (MESH), illustrated here as the lower face, is an optional air focus plate AFP, as shown. The construction of air focus plate AFP is in some respects similar to the bead dispersion plate BDP in that it has apertures and optional depressions coincident with the bead dispersion zones BDZ of the bead dispersion plate BDP. As can be seen, the air focus plate AFP resembles, in part, a 3 dimensional mirror image of the bead dispersion plate BDP, reflected vertically across the charging mesh. The apertures and optional depressions in air focus plate AFP can focus and guide acoustically-generated periodic air flow (shown, AIR FLOW) that is used to stimulate movement of beads toward the bead collection zones BCZ of the bead transporter chuck. The resultant rough bead motion (BEAD MOTION) is depicted as shown, with beads issuing from the four bead dispersion zones BDZ. Of course, in some embodiments it may be advantageous to optimize focusing of the air flow by shaping the air focus plate AFP differently than the mirror image of the bead dispersion plate BDP.

This periodic air flow (AIR FLOW) can be provided acoustically, for example, by conventional speaker S, affixed or held to the underside of the acoustic bead charger/dispenser. Speaker enclosure SE of speaker S is shown sealably held to the underside of the air focus plate AFP, using gasket SG, so it may be in fluid communication with the bead dispersion plate BDP and direct acoustic energy to the bead dispersion zones BDZ. Speaker S can use well known components to generate acoustic energy, such as a paper cone (Cone) as shown, attached to and driven by a coil SC. Coil SC operates in an prevailing magnetic field provided by permanent magnet SM, which is installed into a lower recess inside speaker enclosure SE.

Figure 2:
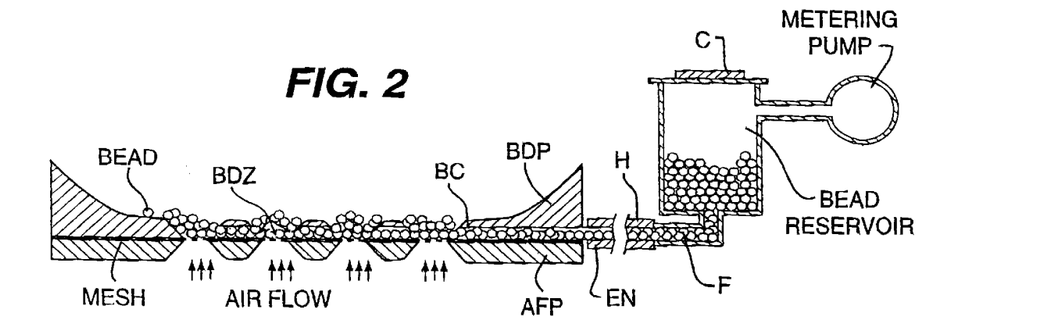
FIG. 2 shows another cross-sectional view of the acoustic bead charger/dispenser of FIG. 1, but not showing a bead transporter chuck or speaker; adding a bead metering system; and showing beads at rest on the bead dispersion plate.

Now referring also to FIG. 2, another cross-sectional view of the acoustic bead charger/dispenser of FIG. 1 is shown, but showing now a possible bead metering and distribution technique. The bead transporter chuck and speaker are omitted for clarity. Beads (Bead) are now shown at rest at the bead dispersion zones BDZ on the bead dispersion plate BDP, awaiting a burst of air flow (AIR FLOW) as shown. Full taper of the outer edges of the bead dispersion plate BDP is now visible. However, as can be seen, beads are fed to the bead dispersion zones BDZ through bead channeling BC cut or formed in the bottom portion of the bead dispersion plate BDP. This bead channeling BC can be optionally connected via entry nozzle EN and hose H to a bead reservoir (Bead Reservoir) whose bead output is conveyed through exit feed F. The bead reservoir can be loaded through hermetic seal cap C, and can optionally be in hermetic fluid communication with an air or metering pump (Metering Pump), of known construction, that may be used to add and remove beads from the bead dispersion plate BDP in a controlled manner.

Figure 3:
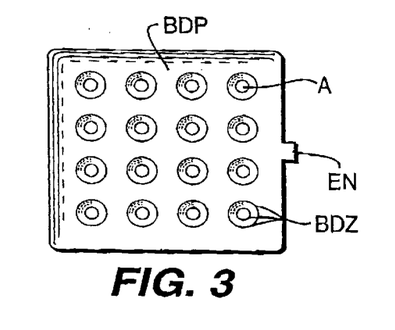
FIG. 3 shows a surface top view of the bead dispersion plate BDP of FIGS. 1 and 2, configured for sixteen pixels or bead dispersion zones.
Figure 4:
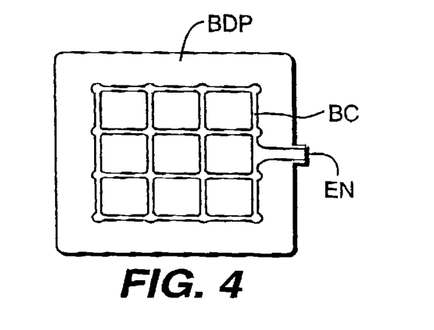
FIG. 4 shows a surface bottom view of the bead dispersion plate BDP of FIG. 3, configured for sixteen pixels or bead dispersion zones.

Referring now also to FIGS. 3 and 4, the bead channeling BC and other features of the bead dispersion plate BDP can be seen. FIGS. 3 and 4 show a surface top view, and a surface bottom view, respectively, of the bead dispersion plate BDP of FIGS. 1 and 2, configured for sixteen pixels or bead dispersion zones. The top surface view shown in FIG. 3 shows apertures A and depressions that form sixteen bead dispersion zones BDZ, with the edges of the plate tapered upward as mentioned above. The bottom surface view of FIG. 4 shows bead channeling BC explicitly, optionally connected to entry nozzle EN for controlled input of beads. The bead channeling BC can be of a depth or overall diameter that is greater than one bead diameter and less than two bead diameters, or using other sizing that is appropriate for bead handling and control, or as dictated by known principles in the powder/bulk solids transport art. The bottom surface of bead dispersion plate BDP may be flat as shown, to fit with the mesh (MESH).

Spacing of the bead collection zones BCZ and corresponding bead dispersion zones BDZ can vary, depending on the number and size of beads to be manipulated. For example, the entire surface of the bead dispersion plate BDP as shown in FIG. 3, with all sixteen pixels or bead dispersion zones, can be a square of sides 49 mm in length; or it can be much smaller, say, 5 mm square, or 1.0 mm square, for manipulating small beads for placement on a smaller substrate, such as a pill or capsule. Close packing of beads thus placed can allow high numbers of beads to make up and individual dosage form. These larger numbers in turn narrows resulting standard deviations in bead diameters, surface areas, and volumes for the bead population making up each sample pill, capsule, tablet, etc.

It is important to keep in mind that bead or particle charging—whether by triboelectric and contact transfer, corona charging, thermionic or field emission charging, or otherwise—typically occurs essentially at the particle surfaces. These surface effects are well known, and are aided by electric polarization, that is, induced surface charge in response to an applied electric field. Polarization is ubiquitous in nature. A charged rod, for example, will attract uncharged bits of paper, etc.

In practice, one introduces charged beads into the bead dispenser or container (not shown) and the space shown between the acoustic bead charger/dispenser and the bead transporter chuck with its bead contact surface BCS. For attracting and retaining negatively charged beads, for example, one can apply a negative bias to the bead dispersion plate BDP and/or charging mesh, and a positive bias to the bead electrode 9, while, for example, a grounded shield electrode 10 (which enhances user safety at the bead contact surface) or a negatively biased shield electrode 10 helps guide beads to their intended destinations at the bead collection zones BCZ. Electric attraction field $E_a$ as shown reflects any attractive potential applied to bead electrode 9.

Generally, there is a discrimination field due to any applied voltage $V_a$ applied between [1] the bead transporter chuck, generally at bead electrode 9; and [2] the bead dispersion plate BDP and/or mesh (MESH) found at the acoustic bead charger/dispenser. In this way, the charging mesh can also serve as an acceleration electrode.

As an example, bead electrode 9 can be biased at +3000 volts; both the bead dispersion plate BDP and mesh (MESH) at −2000 volts; and the shield electrode 10 grounded (set to 0 volts), for manipulating negatively charged beads. These applied voltages create an attractive field at bead electrode 9, and a repulsive field at the bead dispersion plate BDP and the mesh (MESH). This gives an applied voltage $V_a$ of 5000 volts total across an approximate distance D as shown, and a resulting discrimination field roughly equal to $V_a/D$. This will function in sorting out beads according to polarity and charge/mass ratio, with beads of a certain charge/mass ratio and correct polarity being encouraged to seat themselves at the bead collection zones. The distance between the bead transporter chuck and the charging mesh can be about ¼" (6.3 mm), although any distance D can be used.

Generally, to attract and retain beads, the total electrical force $F_{elec}$ generated in the electric field E inside the bead dispenser or container (not shown) on a bead with mass m and charge q must be equal, to or greater, overall, than the force $F_{grav}$ of gravity:

$$F_{elec}=Eq \geq F_{grav}=mg \quad (1)$$

There is also electric polarization in the beads moving about the space between the bead dispersion plate BDP and the bead transporter chuck, giving rise to a polarization field. We may sum this field and the discrimination field, and refer to them simply as the polarization and discrimination field, $E_p$; a sample rough field line is shown, labelled, "$E_p$." However, the polarization and discrimination field, $E_p$, is mostly determined by the applied voltage $V_a$ between the bead dispersion plate BDP and the bead electrode 9 across an the approximate overall distance D as shown in FIG. 1, $$E_p \approx V_a/D \quad (2)$$

and $E_p$ is generally—but does not have to be—set to be more than that required to lift the beads in the absence of an attraction field from any of the bead electrodes:

$$E_p \geq g/(q/m) \quad (3)$$

The field $E_p$ across a the distance D shown is gradual; as mentioned above, the electrostatic image force dominates in the vicinity of the bead dispersion zones BDZ.

As the bead approaches the bead dispersion plate BDP or the mesh (MESH), an surface image charge of increasing magnitude will accumulate there, as discussed above. In the vicinity of bead dispersion plate BDP or the mesh (MESH), with the bead in question at a distance d (not shown) from either surface, the electrostatic image force, $F_{image}$, due to this image charge is in practice more significant than the force $F_{elec}$ given above. Roughly, the dependence of the electrostatic image force on the distance d for a given charge q on a bead, is as follows, using Coulomb's Law for stationary point charges:

$$F_{image} = \frac{q^2}{4\pi\varepsilon_0 d^2 (\pi d_{bead}^3/6)\rho g}. \quad (4)$$

In the denominator, $\varepsilon_0$ is the vacuum permittivity; $(\pi d^3/6)$ is the bead volume; $\rho$ is the bead mass density in kg/m$^3$; and g is the acceleration due to gravity. This gives the electrostatic image force on a bead approaching or resting on either the bead dispersion plate BDP, or charging mesh, in units of g. For small distances d, such as when a bead is actually resting on or against either the bead dispersion plate or the mesh, the electrostatic image force can be quite high.

However, this electrostatic image force-induced holding of beads to the plate or mesh can be broken by mechanical intervention in the form of a pressure or acoustic wave that makes the beads bounce momentarily away from the either surface. This lowers the electrostatic image force—as electric fields by their nature attenuate in an inverse square relationship—allowing the beads to escape the pull of the electrostatic image force and respond to the polarization and discrimination field $E_p$.

Specifically, by using acoustic stimulation provided by speaker S, and using sufficient energy intensity, I, in watts per square meter, pressure waves will impinge upon, and be focused by, the air focus plate AFP, the mesh (MESH), and the bead dispersion plate BDP, resulting in acoustic pressure waves into one direction—aimed to, and aligned with—the bead collection zones of the bead transporter chuck.

For an energy intensity I (watts/m$^{\wedge 2}$) delivered by speaker S through the apertures in air focus plate AFP, and through the mesh (MESH) to beads situated in each bead dispersion zones BDZ, the resulting pressure variation amplitude P in N/m$^{\wedge 2}$ is $$P=(2I\rho c)^{\wedge 1/2} \quad (5)$$

where $\rho$ is the mass density of the air or other elastic medium used in the environment inside the bead dispenser, and c is the propagation speed of sound or acoustic propagation speed. The propagation speed c of the medium may be obtained by measuring B, the adiabatic bulk modulus of the medium, using the relation:

$$c=(B/\rho)^{\wedge 1/2} \quad (6)$$

The bulk modulus B is the reciprocal of the compressibility, the fractional decrease in volume per unit increase in pressure, for the medium.

To achieve periodic bead motion toward the bead collection zones of the bead transporter chuck, it is simply necessary to use speaker S to impart a sufficient acoustic intensity I to cause a desired and effective pressure amplitude variation P that will cause the beads to bounce up and down off the surface to which they are retained by the electrostatic image force.

Notably, sufficient acoustic intensity I and pressure amplitude variations P will cause the beads to undergo liftoff, imparting bead motion amplitude in mainly one direction, toward the bead collection zones. This effectively imparts translational kinetic energy to the bead in the preferred direction, reducing bead scatter and enhancing accurate bead capture only in bead collection zones. Further, this launch assistance with an emphasis on one translational degree of freedom (one direction) is spatially focused or aligned with the intended bead collection zones as well.

The result is that when beads are loaded into or are simply present at one or more bead dispersion zones BDZ, this applied acoustic energy will establish bead motion aimed and aligned with the bead collection zones BCZ. Any applied discrimination field as given above will further guide beads to their intended destinations.

Available bead compositions are well known in the art, and are typically polymer-based, such as divinylbenzene copolymer; polystyrene; polyethylene glycol; or polyethylene glycol graft polystyrene, such as supplied under the trade name PEG-PS by PerSeptive Biosystems of Framingham, Mass.; or cross-linked polyethylene glycol resin, as supplied by Rapp Polymer GmbH of Germany. Beads can be dry, or may have absorbed or adsorbed an aqueous solution, or a fine powder. Beads can also be, for example, dry paint or phosphor particles, or any other powders that can be triboelectrically charged.

Beads can be charged prior to their application to the bead transporter chuck, for example, using plasma charging, or by the use of tribocharging (rubbing or contact charging) as known in the art. Materials that can be used for tribocharging include polytetrafluoroethylene (TEFLON®), and polymers of chlorotrifluorethylene, chlorinated propylene, vinyl chloride, chlorinated ether, 4-chlorostyrene, 4-chloro-4-methoxy-styrene, sulfone, epichlorhydrin, styrene, ethylene, carbonate, ethylene vinyl acetate, methyl methacrylate, vinyl acetate, vinyl butyral, 2-vinyl pyridine styrene, nylon and ethylene oxide. See, for example, "Triboelectrification of Polymers" in K. C. Frisch and A. Patsis, *Electrical Properties of Polymers* (Technomic Publications, Westport, Conn.), which is hereby incorporated by reference in its entirety. Also see *Handbook of Electrostatic Processes*, Jen-shih Chang, Arnold J. Kelly, and Joseph M. Crowley, eds., Marcel Dekker, Inc., New York, ©1995. For example, polytetrafluoroethylene and polyethylene and other materials that become negatively charged tend to create a positive charge on the bead or object. Nylon and other materials that become positively charged will tend to create a negative charge on the bead or object. When using mechanical shaking to tribocharge polymer beads, it is preferred that the ratio of the amount or mass of tribocharging material used to charge the beads to the amount or mass of beads is such that their respective total surface areas are about equal.

However, it has been found that beads can be tribocharged by the mesh while the acoustic bead charger/dispenser is undergoing acoustic stimulation. This can happen by charge induction, where the mesh repulses charge carriers in the beads, and these charge carriers are drained off by contact with other beads or surfaces. Thus, the charging mesh can serve simultaneously as both a driving electrode and a charging mesh. Any number of mesh types can be used, such as a #270 mesh (Newark Wire Cloth Co Newark N.J.) or a # 200 mesh, so long as beads cannot readily pass downward through the mesh.

Acoustic stimulation also assists in providing even distribution of beads throughout the bead channeling BC and the bead dispersion zones BDZ. With acoustic stimulation, beads will distribute randomly throughout the interconnected bead channeling BC across the bead dispenser plate BDP, providing even distribution of beads throughout. Using air flow through focused openings and optionally using resonant frequencies to enhance bead motion effects, the bead dispersion plate BDP with its bead dispersion zones BDZ acts as a distribution plate, a launching aid, and an alignment jig.

The distribution scheme shown also allows bead feeding control. The metering pump (Metering Pump) allows pneumatic (e.g., air) feeding or metering of beads into the bead channeling BC. Beads are also pneumatically retrievable by the metering pump. This allows quick switching of bead types in a manner which is facile and easily monitored. Light sensors, such as those given above, can be used to sense when all beads have been withdrawn from the bead transporter chuck through the entry nozzle EN.

In the course of using the bead transporter chucks, a number of operating modes can be used. For bead pickup or retention, a bead electrode, either exposed or unexposed to the bead contact surface, is electrically biased to attract beads, while the bead dispersion plate BDP and mesh (MESH) or other conductive surface can be biased oppositely. Any number of bead electrodes 9 can be used, and they can be individually and separately connected by known means to facilitate individual and selective addressing in two dimensions.

During bead pickup, the shield electrode 10 can be held at ground potential, or it can be biased to a charge polarity similar to that of the desired beads. The shield electrode 10 then becomes repulsive.

However, even when grounded and not acting in an explicitly repulsive manner, shield electrodes are useful, helping to define and shape the attraction field $E_a$ set up by the bead electrodes, particularly because the attraction field would otherwise be shaped instead by any dielectric material used surrounding the bead electrode, such as dielectric layer D. Shield electrode 10 can be allowed to "float," not biased or grounded. Generally however, grounded or not, good results are obtained when the shield electrodes are grounded, or when biased at a voltage between that applied to the bead electrode(s) 9 and that applied to the mesh (MESH).

Once attracted and retained, beads on the bead transporter chuck are optionally transported to a substrate, microtiter plate, or other destination by moving the entire bead transporter chuck, or alternatively, the target substrate or plate is brought to the chuck. Beads are then released or discharged in a controlled manner when any or all of the applied voltages, such as those given above, are reversed or set to zero. For example, for bead release, only the bead electrode 9 can be shorted out or grounded (0 volts), or have an opposite voltage applied. Optionally, when shield electrode 10 is used, it can be biased to be repulsive to beads during bead discharge. Acoustic releasing mechanisms or processes can be used to aid in bead discharge and placement.

When using bead transporter chucks according to the present invention, the temperature is preferably between −50° C. and 200° C., and more preferably between about 22° C. and 60° C. Relative humidity can be 0–100 percent, so long as condensation does not occur; more preferably the relative humidity is about 30 percent.

Bead electrodes 9 can comprise any number of separately addressable pixels or elements in two directions x and y, each having separately controlled bead collection zones. Any number of well known means and structures can be used to facilitate addressing as is known in the electrical and electronic arts. In this way, combinational synthesis or analysis can be simplified as discussed above. In using the bead transporter chucks, one can expose the bead contact surface of such a chuck to beads; selectively apply voltages, such as the voltages given above, for each x-y addressable well, pixel, or individual spatial element of the chuck, to attract and retain beads selectively at each bead collection zone; then release the beads onto a desired destination aligned with the bead transporter chuck by selectively reversing or reducing voltages associated with each bead collection zone as required.

It is also possible that beads attracted by the chuck, especially large diameter beads or objects of large overall size, say 3 mm in diameter, can by known process design become substrates, to be coated with a pharmaceutically active compound. Such beads could include oblong shapes, made of water soluble film, such as hydroxypropyl methyl cellulose resin. See U.S. Pat. No. 5,714,007, "Methods and Apparatus for Electronically Depositing a Medicament Powder Upon Predefined Regions of a Substrate," issued Feb. 3, 1998, and continuation-in-part thereof filed, Ser. No. 6,007,630, which documents are incorporated herein by reference in their entirety.

In this way, electrostatic chucks can be scaled up for large scale continuous manufacturing of electrostatically coated substrates, such as using a sheet of an edible substrate for use with tablets, for example, or a sheet of an inhaler substrate. For example, hydroxypropyl methyl cellulose can be used, such as Edisol M Film M-900 or EM 1100 available from Polymer Films Inc. (Rockville Conn.). Generally, sizing of bead diameters can range from less than one micron to 1000 microns or larger; 150 microns is fairly typical.

As an example of the operation of the acoustic bead charger/dispenser, one can use the sixteen pixel bead dispersion plate BDP and bead transporter chuck, as shown, having the bead dispersion zones and bead collection zones about 0.35" (9 mm) apart. The bead channeling BC can comprise grooves of width 2 mm, and depth 625 microns. Using 425–500 micron diameter polystyrene beads, 215 milligrams of beads may be gently pumped into the bead dispersion plate BDP to allow filling of each bead dispersion zone BDZ with about 15–20 beads, although less filling, using about 2–3 beads per bead dispersion zone works well also. Four watts of total (nominal, or gross) acoustic energy with a primary frequency of 126 Hz can be used. Using a distance D of about ¼" (6 mm) (¼" to 2" (50 mm) may be used as well, with ⅜" often giving optimum results), more even, accurate and directed bead collection is observed than that obtained without the use of the acoustic bead charger/dispenser.

The primary acoustic input frequency supplied by speaker S can vary. Beads have been found to respond well to sound between 10–400 Hz, but this frequency will depend on the mass of the beads selected; the adiabatic bulk modulus and/or mass density of the elastic medium (e.g, air) used in the bead dispenser; the electrostatic image forces encountered; the distance D selected; and other factors. One can optimize the acoustic frequency somewhat by making the period of vibration somewhat faster than the time required for the beads to bounce or jump toward the bead transporter chuck. Too high an acoustic frequency can cause the beads to vibrate, but not bounce or jump in the required manner.

The taper shown on the outer edges of bead dispersion plate BDP can be helpful to return beads to bead dispersion zones BDZ. This taper can be relaxed in the immediate vicinity of each bead dispersion zone, so as to moderate somewhat the bead return flow, helping to prevent transitory bead overloading during acoustic stimulation.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An acoustic bead charger/dispenser for aligning beads with one or more targets, and for propelling the beads toward the targets, comprising:

a bead dispersion plate shaped and configured to provide one or more cavities effective to collect at least one of the beads at a bead dispersion zone that is spatially aligned with a corresponding said target;

a speaker in fluid communication with the bead dispersion plate for providing acoustic energy thereto to propel said bead toward the bead collection zone.

2. The acoustic bead charger/dispenser of claim 1, wherein the bead dispersion plate is further shaped and configured such that the acoustic energy from said speaker is directed so as to impart to the bead translational kinetic energy primarily in a direction toward the target.

3. The acoustic bead charger/dispenser of claim 1, wherein the bead dispersion plate comprises a conductive material.

4. The acoustic bead charger/dispenser of claim 3, wherein the speaker for providing acoustic energy imparts sufficient translational kinetic energy to the bead so as to remove the bead from the bead dispersion zone when the bead is under the influence of an electrostatic image force.

5. The acoustic bead charger/dispenser of claim 1, wherein the bead dispersion plate comprises a mesh comprising holes or perforations of a size selected to be less than the diameter of the beads said mesh forming the base of the cavities.

6. The acoustic bead charger/dispenser of claim 1, wherein the bead dispersion plate comprises bead channeling allowing fluid communication to the bead dispersion zone; the bead channeling sized and configured to allow passage of bead therethrough.

7. The acoustic bead charger/dispenser of claim 1, wherein the acoustic bead charger/dispenser additionally comprises an air focus plate, formed and configured to direct the acoustic energy to the bead dispersion zone of the bead dispersion plate.

8. The acoustic bead charger/dispenser of claim 5, wherein the mesh is conductive.

9. The acoustic bead charger/dispenser of claim 8, further comprising a power source adapted to apply a voltage on the mesh, which voltage is selected to repel the beads.

10. The acoustic bead charger/dispenser of claim 8, wherein beads are fed to one or more bead dispersion zones through at least one bead channeling cut or formed in the bead dispersion plate.

11. The acoustic bead charger/dispenser of claim 10, wherein the bead channeling is connected to a bead reservoir.

12. The acoustic bead charger/dispenser of claim 1, wherein the bead dispersion plate is shaped and configured to provide two or more cavities effective to collect at least one of the beads at a corresponding bead dispersion zone, the charger/dispenser further comprising:

an electrostatic chuck comprising bead attracting electrodes and two or more bead collection zones at which the electrodes provide a bead-attracting electromagnetic force, the bead collection zones aligned with corresponding bead dispersion zones.

* * * * *